US010250433B1

(12) United States Patent
Thompson et al.

(10) Patent No.: US 10,250,433 B1
(45) Date of Patent: Apr. 2, 2019

(54) METHOD AND SYSTEM FOR PEER-TO-PEER OPERATION OF MULTIPLE RECORDING DEVICES

(71) Applicant: WatchGuard, Inc., Allen, TX (US)

(72) Inventors: David C. Thompson, Plano, TX (US); Eric Riley, Wylie, TX (US); James Walter Exner, Plano, TX (US); Brent G. Robertson, Richardson, TX (US)

(73) Assignee: WatchGuard, Inc., Allen, TX (US)

( * ) Notice: Subject to any disclaimer, the term of this patent is extended or adjusted under 35 U.S.C. 154(b) by 221 days.

(21) Appl. No.: 15/470,288

(22) Filed: Mar. 27, 2017

Related U.S. Application Data

(60) Provisional application No. 62/313,349, filed on Mar. 25, 2016.

(51) Int. Cl.
G06F 15/173 (2006.01)
G06F 15/16 (2006.01)
H04L 12/24 (2006.01)
H04L 12/18 (2006.01)

(52) U.S. Cl.
CPC ........ *H04L 41/046* (2013.01); *H04L 12/1822* (2013.01)

(58) Field of Classification Search
USPC .................. 709/231, 202, 203, 224, 206
See application file for complete search history.

(56) References Cited

U.S. PATENT DOCUMENTS 3,752,047 A 8/1973 Gordon et al.
4,258,421 A 3/1981 Juhasz et al.
4,420,238 A 12/1983 Felix
4,688,244 A 8/1987 Hannon et al.
4,754,255 A 6/1988 Sanders et al.
4,786,900 A 11/1988 Karasawa et al.
(Continued)

FOREIGN PATENT DOCUMENTS

EP 707297 A1 4/1996
FR 2698596 B1 2/1995
(Continued)

OTHER PUBLICATIONS

Sony Corporation; "Network Camera: User's Guide: Software Version 1.0: SNC-RZ25N/RZ25P"; 2004; 81 pages.
(Continued)

*Primary Examiner* — Jude Jean Gilles
(74) *Attorney, Agent, or Firm* — Winstead PC

(57) ABSTRACT

In an embodiment, a method includes receiving a first status message from a first recording device. The first status message includes a first recording identifier. The method further includes determining to initiate a second recording on a particular recording device based, at least in part, on the first status message and configuration settings. In addition, the method includes initiating a second recording on the particular recording device. Furthermore, the method includes creating a second recording identifier. The method also includes storing information related to the first recording identifier and the second recording identifier in a metadata file. Additionally, the method includes transmitting a second status message for receipt by other recording devices. The second status message includes the second recording identifier.

20 Claims, 6 Drawing Sheets

(56) References Cited

U.S. PATENT DOCUMENTS

| | | |
|---|---|---|
| 4,789,904 A | 12/1988 | Peterson |
| 4,831,438 A | 5/1989 | Bellman, Jr. et al. |
| 4,843,463 A | 6/1989 | Michetti |
| 4,949,186 A | 8/1990 | Peterson |
| 4,992,943 A | 2/1991 | McCracken |
| 4,993,068 A | 2/1991 | Piosenka et al. |
| 5,027,104 A | 6/1991 | Reid |
| 5,111,289 A | 5/1992 | Lucas et al. |
| 5,136,655 A | 8/1992 | Bronson |
| 5,164,827 A | 11/1992 | Paff |
| 5,185,667 A | 2/1993 | Zimmermann |
| 5,430,431 A | 7/1995 | Nelson |
| 5,485,611 A | 1/1996 | Astle |
| 5,491,464 A | 2/1996 | Carter et al. |
| 5,491,511 A | 2/1996 | Odle |
| 5,570,127 A | 10/1996 | Schmidt |
| 5,579,239 A | 11/1996 | Freeman et al. |
| 5,677,979 A | 10/1997 | Squicciarini et al. |
| 5,682,133 A | 10/1997 | Johnson et al. |
| 5,689,442 A | 11/1997 | Swanson et al. |
| 5,708,780 A | 1/1998 | Levergood et al. |
| 5,726,450 A | 3/1998 | Peterson et al. |
| 5,734,337 A | 3/1998 | Kupersmit |
| 5,742,336 A | 4/1998 | Lee |
| 5,787,367 A | 7/1998 | Berra |
| 5,799,083 A | 8/1998 | Brothers et al. |
| 5,815,093 A | 9/1998 | Kikinis |
| 5,852,664 A | 12/1998 | Iverson et al. |
| 5,857,159 A | 1/1999 | Dickrell et al. |
| 5,890,079 A | 3/1999 | Levine |
| 5,917,405 A | 6/1999 | Joao |
| 5,920,338 A | 7/1999 | Katz |
| 5,926,210 A | 7/1999 | Hackett et al. |
| 6,008,841 A | 12/1999 | Charlson |
| 6,028,528 A | 2/2000 | Lorenzetti et al. |
| 6,037,977 A | 3/2000 | Peterson |
| 6,076,026 A | 6/2000 | Jambhekar et al. |
| 6,092,008 A | 7/2000 | Bateman |
| 6,098,157 A * | 8/2000 | Hsu ............... H04L 41/142 707/999.006 |
| 6,121,898 A | 9/2000 | Moetteli |
| 6,141,611 A | 10/2000 | Mackey et al. |
| 6,151,065 A | 11/2000 | Steed et al. |
| 6,211,907 B1 | 4/2001 | Scaman et al. |
| 6,259,475 B1 | 7/2001 | Ramachandran et al. |
| 6,330,025 B1 | 12/2001 | Arazi et al. |
| 6,332,193 B1 | 12/2001 | Glass et al. |
| 6,421,080 B1 | 7/2002 | Lambert |
| 6,430,488 B1 | 8/2002 | Goldman et al. |
| 6,490,513 B1 | 12/2002 | Fish et al. |
| 6,518,881 B2 | 2/2003 | Monroe |
| 6,542,076 B1 | 4/2003 | Joao |
| 6,545,601 B1 | 4/2003 | Monroe |
| 6,546,363 B1 | 4/2003 | Hagenbuch |
| 6,553,131 B1 | 4/2003 | Neubauer et al. |
| 6,556,905 B1 | 4/2003 | Mittelsteadt et al. |
| 6,559,769 B2 | 5/2003 | Anthony et al. |
| 6,631,522 B1 | 10/2003 | Erdelyi |
| 6,636,256 B1 | 10/2003 | Passman et al. |
| 6,684,137 B2 | 1/2004 | Takagi et al. |
| 6,696,978 B2 | 2/2004 | Trajkovic et al. |
| 6,831,556 B1 | 12/2004 | Boykin |
| 6,950,013 B2 | 9/2005 | Scaman et al. |
| 6,950,122 B1 | 9/2005 | Mirabile |
| 6,959,122 B2 | 10/2005 | McIntyre |
| 6,965,400 B1 | 11/2005 | Haba et al. |
| 7,119,674 B2 | 10/2006 | Sefton |
| 7,131,136 B2 | 10/2006 | Monroe |
| 7,180,407 B1 | 2/2007 | Guo et al. |
| 7,190,882 B2 | 3/2007 | Gammenthaler |
| 7,363,742 B2 | 4/2008 | Nerheim |
| 7,382,244 B1 | 6/2008 | Donovan et al. |
| 7,570,158 B2 | 8/2009 | Denny et al. |
| 7,570,476 B2 | 8/2009 | Nerheim |
| 7,576,773 B2 * | 8/2009 | Fukushima ........... H04N 5/765 348/207.1 |
| 7,711,150 B2 | 5/2010 | Simon |
| 7,768,548 B2 | 8/2010 | Silvernail et al. |
| 7,804,426 B2 | 9/2010 | Etcheson |
| 7,925,635 B1 * | 4/2011 | Ravulur ............ G06F 11/3423 705/52 |
| 7,944,676 B2 | 5/2011 | Smith et al. |
| 8,050,206 B2 | 11/2011 | Siann et al. |
| 8,446,469 B2 | 5/2013 | Blanco et al. |
| 8,594,485 B2 | 11/2013 | Brundula |
| 8,781,292 B1 | 7/2014 | Ross et al. |
| 8,805,431 B2 | 8/2014 | Vasavada et al. |
| 8,837,901 B2 | 9/2014 | Shekarri et al. |
| 8,856,174 B2 * | 10/2014 | Fueta ................. G06Q 10/063 707/776 |
| 9,019,431 B2 | 4/2015 | Phillips et al. |
| 9,058,499 B1 | 6/2015 | Smith |
| 9,159,371 B2 | 10/2015 | Ross et al. |
| 9,253,452 B2 | 2/2016 | Ross et al. |
| 9,325,950 B2 | 4/2016 | Haler |
| 9,331,997 B2 | 5/2016 | Smith |
| 9,377,161 B2 | 6/2016 | Hanchett et al. |
| 9,871,993 B2 * | 1/2018 | Vanman ............... G08G 1/054 |
| 2002/0135679 A1 | 9/2002 | Scaman |
| 2002/0183905 A1 | 12/2002 | Maeda et al. |
| 2003/0052798 A1 | 3/2003 | Hanson |
| 2003/0086000 A1 | 5/2003 | Siemens et al. |
| 2003/0151663 A1 | 8/2003 | Lorenzetti et al. |
| 2003/0154009 A1 | 8/2003 | Basir et al. |
| 2003/0210329 A1 | 11/2003 | Aagaard et al. |
| 2003/0210806 A1 | 11/2003 | Yoichi et al. |
| 2003/0212567 A1 | 11/2003 | Shintani et al. |
| 2004/0008255 A1 | 1/2004 | Lewellen |
| 2004/0201765 A1 | 10/2004 | Gammenthaler |
| 2004/0252193 A1 | 12/2004 | Higgins |
| 2005/0083404 A1 | 4/2005 | Pierce et al. |
| 2005/0099273 A1 | 5/2005 | Shimomura et al. |
| 2005/0101334 A1 | 5/2005 | Brown et al. |
| 2005/0151852 A1 | 7/2005 | Jomppanen |
| 2005/0243171 A1 | 11/2005 | Ross et al. |
| 2005/0258942 A1 | 11/2005 | Manasseh et al. |
| 2006/0012683 A9 | 1/2006 | Lao et al. |
| 2006/0133476 A1 | 6/2006 | Page et al. |
| 2006/0209189 A1 | 9/2006 | Simpson |
| 2006/0274166 A1 | 12/2006 | Lee et al. |
| 2007/0013776 A1 | 1/2007 | Venetianer et al. |
| 2007/0035612 A1 | 2/2007 | Korneluk et al. |
| 2007/0058856 A1 | 3/2007 | Boregowda et al. |
| 2007/0069921 A1 | 3/2007 | Sefton |
| 2007/0188612 A1 | 8/2007 | Carter |
| 2007/0219686 A1 | 9/2007 | Plante |
| 2007/0260363 A1 | 11/2007 | Miller |
| 2007/0274705 A1 | 11/2007 | Kashiwa et al. |
| 2008/0100705 A1 | 5/2008 | Kister et al. |
| 2008/0175479 A1 | 7/2008 | Sefton et al. |
| 2008/0285803 A1 | 11/2008 | Madsen |
| 2009/0002491 A1 | 1/2009 | Haler |
| 2009/0088267 A1 | 4/2009 | Shimazaki et al. |
| 2009/0195655 A1 | 8/2009 | Pandey |
| 2009/0207252 A1 | 8/2009 | Raghunath |
| 2010/0007495 A1 * | 1/2010 | Hanebeck .......... G08B 13/1427 340/572.1 |
| 2010/0026802 A1 | 2/2010 | Titus et al. |
| 2010/0085857 A1 * | 4/2010 | Herz ................ H04N 21/4126 369/100 |
| 2010/0321183 A1 | 12/2010 | Donovan et al. |
| 2011/0042462 A1 | 2/2011 | Smith |
| 2011/0052137 A1 | 3/2011 | Cowie |
| 2011/0285845 A1 | 11/2011 | Bedros et al. |
| 2013/0041934 A1 * | 2/2013 | Annamalaisami .... H04L 43/026 709/203 |
| 2013/0279757 A1 | 10/2013 | Kephart |
| 2014/0136680 A1 * | 5/2014 | Joshi ................. H04L 43/026 709/224 |
| 2014/0139680 A1 | 5/2014 | Huang et al. |
| 2014/0192192 A1 | 7/2014 | Worrill et al. |
| 2014/0201064 A1 | 7/2014 | Jackson et al. |

(56) References Cited

U.S. PATENT DOCUMENTS

| | | | |
|---|---|---|---|
| 2014/0270467 A1* | 9/2014 | Blemel | G07D 7/2033 |
| | | | 382/143 |
| 2014/0304393 A1* | 10/2014 | Annamalaisami | H04L 43/04 |
| | | | 709/224 |
| 2014/0355951 A1 | 12/2014 | Tabak | |
| 2015/0051502 A1 | 2/2015 | Ross | |
| 2015/0063776 A1 | 3/2015 | Ross et al. | |
| 2016/0035391 A1 | 2/2016 | Ross et al. | |
| 2017/0126748 A1* | 5/2017 | Le Sage | H04L 65/1016 |

FOREIGN PATENT DOCUMENTS

| | | |
|---|---|---|
| GB | 2287152 A | 9/1995 |
| GB | 2317418 A | 3/1998 |
| JP | 2006311039 A | 11/2006 |
| KR | 10-1050897 B1 | 7/2011 |
| WO | WO-1993020655 A1 | 10/1993 |
| WO | WO-1994019212 A2 | 9/1994 |
| WO | WO-1995028783 A1 | 10/1995 |
| WO | WO-1996022202 A1 | 7/1996 |
| WO | WO-1997038526 A1 | 10/1997 |
| WO | WO-1998052358 A1 | 11/1998 |
| WO | WO-1999018410 A1 | 4/1999 |
| WO | WO-01097524 A1 | 12/2001 |
| WO | WO-2004036926 A2 | 4/2004 |
| WO | WO-2007104367 A1 | 9/2007 |
| WO | WO-2013100993 A1 | 7/2013 |
| WO | WO-2014000161 A1 | 1/2014 |
| WO | WO-2016089918 A1 | 6/2016 |

OTHER PUBLICATIONS

Rowe, Lawrence A., et al.; "Indexes for User Access to Large Video Databases"; Storage and Retrieval for Image and Video Databases II, IS&T/SPIE Symp. on Elec. Imaging Sci. & Tech.; San Jose, CA; Feb. 1994; 12 pages.

Polybius; "The Histories," vol. III: Books 5-8; Harvard University Press; 1923; pp. 385 & 387.

Crisman, P.A. (editor); "The Compatible Time-Sharing System: A Programmer's Guide," second edition; The M.I.T. Press, Cambridge Massachusetts; 1965; 587 pages.

Kotadia, Munir; "Gates Predicts Death of the Password"; http://www.cnet.com/news/gates-predicts-death-of-the-password/?ftag=CADe856116&bhid=; Feb. 25, 2004; 3 pages.

Morris, Robert, et al.; "Password Security: A Case History"; Communications of the ACM, vol. 22, No. 11; Nov. 1979; pp. 594-597.

Cranor, Lorrie Faith, et al.; "Security and Usability: Designing Secure Systems that People Can Use"; O'Reilly Media; Aug. 2005; pp. 3 & 104.

Chirillo, John; "Hack Attacks Encyclopedia: A Complete History of Hacks, Cracks, Phreaks, and Spies Over Time"; John Wiley & Sons, Inc.; 2001; 485-486.

Stonebraker, Michael, et al.; "Object-Relational DBMSs: Tracking the Next Great Wave"; Second Ed.; Morgan Kaufmann Publishers, Inc.; 1999; pp. 3, 173, 232-237, 260.

Stonebraker, Michael, et al.; "Object-Relational DBMSs: The Next Great Wave"; Morgan Kaufmann Publishers, Inc.; 1996; pp. 105, 107, 166-168.

Barwick, Sandra; "Two Wheels Good, Four Wheels Bad"; The Independent; http://www.independent.co.uk/voices/two-wheels-good-four-wheels-bad-1392034.html; Feb. 4, 1994; 11 pages.

McFee, John E., et al.; "Multisensor Vehicle-Mounted Teleoperated Mine Detector with Data Fusion"; SPIE Proceedings, vol. 3392; Apr. 13, 1998; 2 pages.

Malcolm, Andrew H.; "Drunken Drivers Now Facing Themselves on Video Camera"; The New York Times; http://www.nytimes.com/1990/04/21/us/drunken-drivers-now-facing-themselves-on-video-camera.html; Apr. 21, 1990; 3 pages.

Kaplan, A.E., et al.; "An Internet Accessible Telepresence"; Multimedia Systems, vol. 5, Issue 2; Mar. 1997; Abstract only; 2 pages.

Sabatini, Richard V.; "State Police Cars in Pa. Get Cameras Patrol Stops Will be Videotaped. The Units will Benefit Citizens and Police, Authorities Say"; http://articles.philly.com/1996-03-30/news/25637501_1_patrol-car-state-police-commissioner-paul-j-evanko; Mar. 30, 1996; 2 pages.

Stockton, Gregory R., et al.; "Why Record? (Infrared Video)"; Infraspection Institute's IR/INFO '98 Symposium, Orlando, Florida; Jan. 25-28, 1998; 5 pages.

Racepak LLC; "Racepak DataLink Software" http://www.racepak.com/software.php.; Feb. 3, 2008; 4 pages.

Pavlopoulos, S., et al.; "A Novel Emergency Telemedicine System Based on Wireless Communication Technology—Ambulance"; IEEE Trans Inf Technol Biomed, vol. 2, No. 4; Dec. 1998; Abstract only; 2 pages.

Horne, Mike; "Future Video Accident Recorder"; http://www.iasa.com.au/folders/Publications/pdf_library/horne.pdf; May 1999; 9 pages.

Townsend & Taphouse; "Microsentinel I"; http://www.blacksheepnetworks.com/security/resources/encyclopedia/products/prod19.htm; Jul. 5, 2003; 1 page.

Security Data Networks, Inc.; "Best of Show Winner at CES Consumer Electronics Show is MicroSentinel(R) Wireless Internet Based Security System that Allows Users to Monitor their Home, Family, or Business using any Internet or E-Mail Connection"; PR Newswire; http://www.prnewswire.com/news-releases/best-of-show-winner-at-ces-consumer-electronics-show-is-microsentinelr-wireless-internet-based-security-system-that-allows-users-to-monitor-their-home-family-or-business-using-any-internet-or-e-mail-connection-73345197.html; Jan. 7, 1999; 3 pages.

Draper, Electra; "Mission Possible for Loronix"; Denver Post; http://extras.denverpost.com/business/top100b.htm; Aug. 13, 2000; 2 pages.

"Choosing the Right Password"; The Information Systems Security Monitor (ISSM); vol. 2, No. 2; Apr. 1992; 2 pages.

Aref, Walid G., et al.; "A Video Database Management System for Advancing Video Database Research"; In Proc. of the Int Workshop on Management Information Systems; Nov. 2002; 10 pages.

ICOP Extreme Wireless Mic, Operation Supplement; 2008.

Raytheon JPS Communications, Ratheon Model 20/20-W, Raytheon 20/20 Vision Digital In-Car Video Systems; Feb. 2010.

Product Review: ICOP Model 20/20-W; May 19, 2009.

State of Utah Invitation to Bid State Cooperative Contract, Contract No. MA503; Jul. 3, 2008.

X26 Taser; date unknown.

Taser X26 Specification Sheet; 2003.

Affidavit of Christopher Butler of Internet Archive attesting to the public availability of the 20/20-W Publication on Nov. 25, 2010.

International Association of Chiefs of Police Digital Video System Minimum Specifications Nov. 21, 2008.

City of Pomona Request for Proposal for Mobile Video Recording System for Police Vehicles; Apr. 4, 2013.

"Taser Int'l (TASR) Challenges to Digital Ally's (DGLY) Patents", StreetInsider.com, http://www.streetinsider.com/Corporate+News/TASER+Intl+(TASER)+Challenges+to+Digital+Allys+(DGLY)+Patents/12302550 html Dec. 1, 2016.

* cited by examiner

METHOD AND SYSTEM FOR PEER-TO-PEER OPERATION OF MULTIPLE RECORDING DEVICES

CROSS-REFERENCE TO RELATED APPLICATIONS

This patent application claims priority from, and incorporates by reference the entire disclosure of, U.S. Provisional Patent Application No. 62/313,349 filed on Mar. 25, 2016.

BACKGROUND

Technical Field

The present disclosure relates generally to media capture and more particularly, but not by way of limitation, to systems and methods for peer-to-peer operation of multiple recording devices.

History of Related Art

It has recently become desirable to record video and audio of encounters between police and members of the public. For example, video and/or audio recordings of a traffic stop by an officer may be recorded by one or more cameras and microphones associated with the officer's car. In some instances, video and audio recordings are also collected from an officer's vantage point by a device associated with the officer. For example, a camera device may be attached to the officer to record what the officer sees and hears. As the number of recording devices increases, the complexity and difficulty to obtain relevant portions of video and audio recordings from all of the available devices also increases.

SUMMARY OF THE INVENTION

In an embodiment, a method is performed by a particular recording device in a peer-to-peer recording system comprising a plurality of networked recording device. The method includes receiving a first status message from a first recording device of the plurality of networked recording devices. The first status message includes an indicator of a decision by the first recording device to initiate a first recording and a first recording identifier that is specific to the first recording. The method further includes determining to initiate a second recording on the particular recording device based, at least in part, on the first status message and configuration settings stored in memory on the particular recording device. The configuration settings include a parameter related to whether the particular recording device will participate in group event recording. In addition, the method includes initiating a second recording on the particular recording device responsive to the determining. Furthermore, the method includes creating a second recording identifier that is specific to the second recording. The method also includes storing information related to the first recording identifier and the second recording identifier in a metadata file for the second recording. Additionally, the method includes transmitting a second status message for receipt by other recording devices of the plurality of networked recording devices. The second status message includes an indicator of a decision by the particular recording device to initiate the second recording and the second recording identifier.

In one embodiment, a network device includes a computer processor and memory such that the computer processor and memory in combination are operable to implement a method. The method includes receiving a first status message from a first recording device of a plurality of networked recording devices. The first status message includes an indicator of a decision by the first recording device to initiate a first recording and a first recording identifier that is specific to the first recording. The method further includes determining to initiate a second recording on the network device based, at least in part, on the first status message and configuration settings stored in memory on the network device. The configuration settings include a parameter related to whether the network device will participate in group event recording. In addition, the method includes initiating a second recording on the network device responsive to the determining. Furthermore, the method includes creating a second recording identifier that is specific to the second recording. The method also includes storing information related to the first recording identifier and the second recording identifier in a metadata file for the second recording. Additionally, the method includes transmitting a second status message for receipt by other recording devices of the plurality of networked recording devices. The second status message includes an indicator of a decision by the network device to initiate the second recording and the second recording identifier.

In one embodiment, a computer-program product includes a non-transitory computer-usable medium having computer-readable program code embodied therein. The computer-readable program code is adapted to be executed to implement a method on a particular recording device in a peer-to-peer recording system comprising a plurality of networked recording devices. The method includes receiving a first status message from a first recording device of the plurality of networked recording devices. The first status message includes an indicator of a decision by the first recording device to initiate a first recording and a first recording identifier that is specific to the first recording. The method further includes determining to initiate a second recording on the particular recording device based, at least in part, on the first status message and configuration settings stored in memory on the particular recording device. The configuration settings include a parameter related to whether the particular recording device will participate in group event recording. In addition, the method includes initiating a second recording on the particular recording device responsive to the determining. Furthermore, the method includes creating a second recording identifier that is specific to the second recording. The method also includes storing information related to the first recording identifier and the second recording identifier in a metadata file for the second recording. Additionally, the method includes transmitting a second status message for receipt by other recording devices of the plurality of networked recording devices. The second status message includes an indicator of a decision by the particular recording device to initiate the second recording and the second recording identifier.

BRIEF DESCRIPTION OF THE DRAWINGS

For a more complete understanding of the present invention thereof, reference may now be had to the following description taken in conjunction with the accompanying drawings, in which.

DETAILED DESCRIPTION

Various embodiments of the present disclosure will now be described more fully with reference to the accompanying drawings. The invention may, however, be embodied in many different forms and should not be construed as limited to the embodiments set forth herein.

Figure 1:
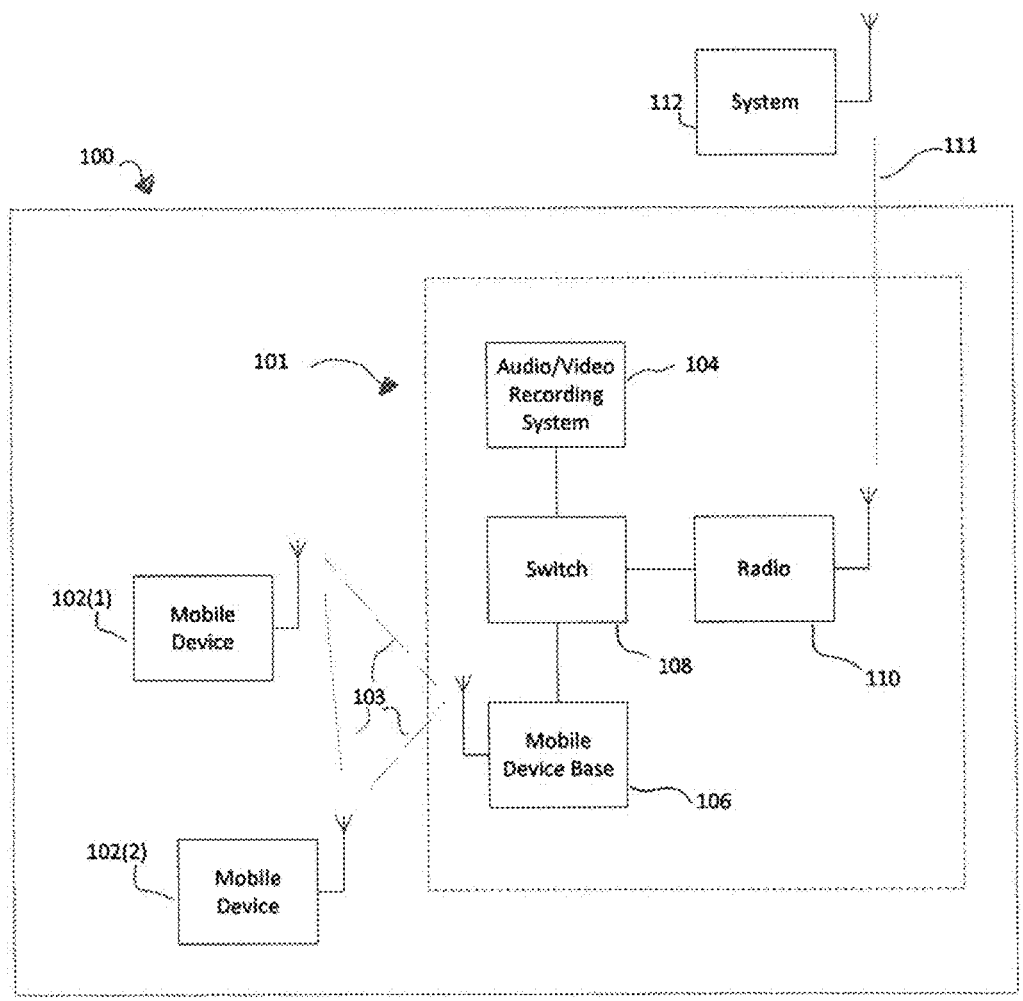
FIG. 1 illustrates an example of a system for distributed multi-peer device management.

FIG. 1 illustrates an example of a distributed multi-peer recording-device management system 100. The system 100 is adapted to enable recording of an event by one or more recording devices. As used herein, an event describes a period of time that is recorded by one or more recording devices of the system 100. An event may be, for example, a traffic stop by an officer, a high-speed pursuit of a suspect, an interview of a suspect or witness, a stakeout, surveillance, and the like. In some embodiments, the system 100 facilitates creation of a group recording of an event. As used herein, a group recording, or group event recording, is a collection of audio and/or video recordings created by two or more recording devices of the system 100. For example, a group recording may include audio and/or video recordings from a recording device worn by an officer, a recording device installed in a police vehicle, a recording device in an interrogation room, a recording device positioned for a stakeout, a recording device positioned for surveillance, and the like.

In a typical embodiment, the system 100 includes a base system 101 and one or more mobile devices 102, mobile devices 102(1) and 102(2) being explicitly shown. In a typical embodiment, the base system 101 is installed in a vehicle. When the base system 101 is installed in a vehicle, the base system 101 may include an audio/video recording system 104, a mobile device base 106, a switch 108, and a radio 110. In some embodiments, the audio/video recording system 104 may be omitted. The radio 110 enables the system 100 to communicate with other systems. For example, the radio 110 may communicate with a system 112 via a wireless network 111. The system 112 may be, for example, a police station or another vehicle. Communication between the audio/video recording system 104 and the mobile device base 106 may be facilitated by the switch 108. The switch 108 may be, for example, a power over Ethernet (POE) switch that provides power to the mobile device base 106.

In a typical embodiment, the base system 101 is installed in a vehicle, such as, for example, a police car. In other embodiments, the base system 101 may be used without a vehicle. For example, the base system 101 may be used in a police station (e.g., in an interrogation room), as part of a remote base of operations (e.g., a temporary police presence at a public gathering, such as, for example, a parade, a fair, and the like), and the like. As shown in FIG. 1, the system 100 includes the mobile device 102(1) and the mobile device 102(2). In some embodiments, the system 100 may include one mobile device 102. In some embodiments, the system 100 may include mobile devices 102(1)-102(n). In some embodiments, one or both of the mobile devices 102(1) and 102(2) may be docked with the mobile device base 106 while not in use. In a typical embodiment, docking the mobile devices 102(1) and 102(2) enables the devices to be charged, to receive updates to a configuration file, and to transfer files to and from the audio/video recording system 104. In a typical embodiment, one or more of the mobile devices 102(1) and 102(2) may be removed from the mobile device base 106 to position the mobile devices 102(1) and 102(2) for the capture of audio and/or video at a location remote from the base system 101. For example, the mobile device 102(1) or 102(2) may be worn by a police officer to capture audio and/or video from the officer's perspective. In some embodiments, the mobile device 102 may be positioned for surveillance, in which case the mobile device 102 may not be worn by an officer.

In some embodiments, the mobile devices 102(1) and 102(2) communicate via a wireless network 103. In a typical embodiment, the wireless network 103 is separate from the wireless network 111 used by the radio 110. Separating the wireless network 103 from the wireless network 111 can serve to increase the security of communications between the mobile devices 102(1) and 102(2). In some embodiments, the wireless network 103 is "undiscoverable" to recording devices unless a recording device has been pre-programmed with information that allows the recording device to connect to the wireless network 103. For example, in some embodiments, to connect each of the mobile devices 102(1) and 102(2) to the wireless network 103, each of the mobile devices 102(1) and 102(2) must be preprogrammed with appropriate network information, credentials, certificates, and the like. In some embodiments, the mobile devices 102(1) and 102(2) may be programmed with the appropriate network information by docking the mobile devices 102(1) and 102(2) in the mobile device base 106.

In a typical embodiment, the radio 110 is coupled to the switch 108 to enable communication between the system 112, the audio/video recording system 104, and each of the mobile devices 102(1) and 102(2). In some embodiments, each of the mobile devices 102(1) and 102(2) may communicate with the system 112 by sending messages to the mobile device base 106, which messages are then routed to radio 110 via the switch 108. In some embodiments, the system 100 may not include the switch 108. In such an embodiment, the radio 110 may instead be directly coupled to the audio/video recording system 104 or the mobile device base 106.

In a typical embodiment, the system 100 is adapted to enable each recording device of the system 100 to send and receive status messages to and from other recording devices within the system 100 and to facilitate identification of group recordings. An example of a recording device will be described in greater detail with respect to FIG. 3. In general, the recording devices of the system 100 can include the one or more mobile devices 102 and the audio/video recording system 104. A status message can be a communication sent by a recording device within the system 100 to inform other recording devices within the system 100 about a current status of the recording device that sent the status message. Status messages may be configured as desired to include various information about a condition or a status of a recording device. In a typical embodiment, a status message may include one or more of the following types of information: recording status (e.g., "on" or "off," recording duration), a unique recording identifier that provides a unique tag for each video recording made by the system 100, global positioning system (GPS) location information, battery level, memory availability, device status (e.g., operational, malfunctioning), last-heard-from (LHF), and the like.

In some embodiments, LHF includes a time stamp or the like to track when a recording device of the system 100 last communicated with another recording device in the system 100.

In a typical embodiment, each time a recording device within the system 100 receives a status message, the status message is analyzed. In a typical embodiment, the status message is analyzed to determine if a change to a recording status of the recording device that received the status message should be made (i.e., start recording, continue recording, or stop recording). Status messages are not themselves instructions for a recording device within the system 100 to begin, continue, or stop recording. Instead, each recording device within the system 100 analyzes a received status message as a part of its determination regarding whether or not to make a change to its recording status. In a typical embodiment, when a recording device within the system 100 receives a status message, the recording device analyzes the received status message and uses its own logic tree to determine whether any action should be taken in response to the status message, such as, for example, whether recording should be initiated, continued, or stopped. A logic tree of a given recording device can represent conditions under which that recording device will change its recording status. In some cases, the logic tree can be expressed using software, parameters of a stored configuration file, a combination of the foregoing, and/or the like. Examples of the logic tree will be described in greater detail with respect to FIGS. 2A-B and 3. In some embodiments, the status message may be analyzed to make additional determinations, such as, for example: if an alert should be sent to other recording devices in the system 100 (e.g., an officer needs assistance), if GPS location information should be shared with other recording devices in the system 100 (e.g., location information may be shared to alert users of the system 100 as to the location of officers during a pursuit to help prevent friendly fire incidents and the like), and the like.

In a typical embodiment, each mobile device 102 of the system 100 is adapted to record audio and/or video of an event. In a typical embodiment, each mobile device 102 includes various modules and systems to enable recording of at least one of audio and video. For example, in some embodiments, the mobile devices 102 may include: a processor such as a central processing unit (CPU), memory, a camera module, an audio module, a radio module, battery module, GPS module, accelerometer and one or more input buttons.

In a typical embodiment, the processor of each of the mobile devices 102 is adapted to control operation of the mobile device 102. For example, the processor may control one or more of a camera module, audio module, radio module, battery module, and GPS module. The processor is also adapted to read and write to the memory. In various embodiments, the memory may include volatile and/or non-volatile memory. For example, the memory may include SD cards, hard disk drives, EEPROM, flash memory, and the like. The memory may be used to store captured audio and/or video data. The memory module may also store various software modules and configuration files for the operation of the mobile device 102. For example, the memory may include a device-specific configuration file that is interpreted by the processor to make decisions based upon status messages received from other recording devices in the system 100.

In a typical embodiment, each of the mobile devices 102(1) and 102(2) is configured to communicate via its radio module with each of the other recording devices associated with the system 100. In a typical embodiment, each of the mobile devices 102(1) and 102(2) is configured to send status messages regarding changes to its status/operating state and to receive status messages from other recording devices within the system 100. For example, in a typical embodiment, when the mobile device 102(1) becomes visible to the mobile device base 106 (e.g., when the device is powered on after being powered off or comes into range of the mobile device base 106), the mobile device 102(1) sends a status message via its radio module to the other devices in the system 100 to inform the other recording devices that the mobile device 102(1) is online. Other changes to operating status that result in the mobile devices 102(1) and 102(2) sending status messages include, for example, information that a mobile device 102 has started recording, stopped recording, a low battery, low memory, an operating fault, a user has indicated that assistance is needed, and the like. In other embodiments, each of the mobile devices 102(1) and 102(2) may be configured to send status messages as desired.

In some embodiments, communication between the mobile devices 102(1) and 102(2) is facilitated by the mobile device base 106. For example, the mobile device 102(1) may send a status message to other devices of the system 100 via the radio module of the mobile device 102(1). The status message may be received by the mobile device base 106, which then relays the status message via a radio module of the mobile device base 106 to the mobile device 102(2) and/or other devices associated with the system 100. For example, in some embodiments, the mobile device base 106 may also relay the status message to the audio/video recording system 104 and/or the system 112.

In some embodiments, communication between the mobile devices 102(1) and 102(2) may be direct (i.e., the mobile devices 102(1) and 102(2) may communicate with each other without relaying messages through the mobile device base 106). For example, each of the mobile devices 102(1) and 102(2) may pass messages directly to each other using its radio module. Wireless networks, such as, for example, ad hoc, Wi-Fi direct, Bluetooth, and the like may be used to enable direct communication between the mobile devices 102(1) and 102(2).

In some embodiments, status messages may be communicated through each of the mobile devices 102(1) and 102(2) in a daisy-chain or multi-hop network arrangement. For example, if the mobile device 102(1) has lost communication with the mobile device base 106 (e.g., the mobile device 102(1) has moved too far away from the mobile device base 106, the radio signal is too weak, the radio signal is blocked or obstructed, etc.), the mobile device 102(1) will lose communication with the mobile device base 106. However, if the mobile device 102(2) is positioned such that the mobile device 102(2) can communicate with both the mobile device 102(1) and the mobile device base 106, status messages may be relayed or daisy-chained between the mobile device 102(1), the mobile device 102(2), and the mobile device base 106, effectively increasing a communication range of the mobile device 102(1).

In some embodiments, the mobile device base 106 periodically monitors the wireless network 103 to keep track of devices that are connected to the wireless network 103. For example, the mobile device base 106 may monitor the wireless network 103 to confirm that each of the mobile devices 102(1) and 102(2) is still in range/communication with the mobile device base 106. In a typical embodiment, the mobile device base 106 uses LHF information to keep track of the last time a particular device was heard from. In some embodiments, each of the mobile devices 102(1) and 102(2) monitors its own connection status to confirm if its connection to the wireless network 103 is still active.

In some embodiments, each of the mobile devices 102(1) and 102(2) may be able to communicate with additional mobile devices associated with a second distributed multi-peer recording-device management system (not shown). For example, the base system 101 may be installed in a first car and the second system may be installed in a second car or may be a part of a remote base of operations. When the mobile devices 102(1) and 102(2) are in communication range with mobile devices from the second system, one or both of the mobile devices 102(1) and 102(2) can communicate with the mobile devices from the second system or a mobile device base of the second system. For example, such communication may occur directly between each of the mobile devices, may be routed via the mobile device base 106 or the device base of the second system, or via a combination of these communication methods.

The mobile device base 106 may include one or more docking ports to receive each of the mobile devices 102(1) and 102(2). The one or more docking ports may serve several purposes. For example, the one or more docking ports may act as a power source for recharging each of the mobile devices 102(1) and 102(2). The one or more docking ports may also be able to initialize or program each of the mobile devices 102(1) and 102(2). For example, when the mobile device 102(1) is docked in one of the one or more docking ports, the mobile device base 106 can transfer configuration information to the mobile device 102(1). In some embodiments, the configuration information includes information regarding the wireless network (e.g., network identifier (ID), Internet Protocol (IP) addresses, credentials, a list of other devices associated with the network that the mobile devices can communicate with, and the like) that is used to enable communication between the mobile device 102(1), the mobile device 102(2), and the mobile device base 106. In some embodiments, some or all of the configuration information for each of the mobile devices 102(1) and 102(2) may be performed by a docking or transfer station that is outside of the system 100. For example, a docking or transfer station may be housed in a police station. When a user receives a mobile device 102 for use, the mobile device 102 may first be docked with the docking or transfer station to upload a configuration file for that user. The configuration file may be customized for each user or may be a default configuration for all users. For example, each user in a unit or squad may use the same configuration file.

In some embodiments, docking the mobile devices 102 with the mobile device base 106 permits the mobile device 102 to connect directly with an event library to upload recordings stored on the mobile device 102. The event library is a central storage repository for recordings captured by recording devices of the system 100. In a typical embodiment, the event library comprises one or more storage devices, such as, for example, hard drives and the like. In a typical embodiment, the event library is located at a police station. In other embodiments, the event library may reside, for example, in the audio/video recording system 104, in the system 112, in cloud storage, and the like. In some embodiments, the event library may be a stand-alone device. In a typical embodiment, the event library may include recordings from a single system 100, a squad comprising more than one system 100, each system 100 associated with a police station, and the like. Recordings may be uploaded to the event library in various ways. For example, recordings may be uploaded from the system 100 when the system 100 is in wireless communication range with the event library. In other embodiments, the system 100 may be connected to the event library via a cable to transfer recordings.

In a typical embodiment, when a recording is made by the mobile device 102(1), the mobile device 102(2), or the audio/video recording system 104, a unique recording identifier is created by the recording device and associated with the recording. In a typical embodiment, the unique recording identifier includes information that is unique to the recording device that made the recording. For example, the unique recording identifier may include the recording device's serial number, media access control (MAC) address, and the like. The unique recording identifier enables someone browsing the event library to access a specific recording so that, at a later time, the specific recording can be coordinated/synchronized with other recordings from a group recording. In a typical embodiment, each recording includes a metadata file that includes various metadata regarding the recording. For example, the metadata file may include the unique recording identifier, information that identifies which recording device made the recording, information that identifies other recording devices that were in communication with the device that made the recording, and the like. The information from the metadata file can be used by the event library to associate each recording from a group recording together so that the entire group recording can be recalled at a later time.

In a typical embodiment, each of the mobile devices 102(1) and 102(2) determines whether or not to start recording, continue recording, or stop recording by following its own logic tree. In some embodiments, each of the mobile devices 102(1) and 102(2) makes such a determination each time a new status message is sent and/or received. In some embodiments, each of the mobile devices 102(1) and 102(2) makes such a determination periodically (e.g., not necessarily in response to sending or receiving a status message). In some embodiments, each of the mobile devices 102(1) and 102(2) makes such a determination in response to a change in its own status. For example, a mobile device 102 may determine that recording should be stopped when the mobile device 102 determines that a battery level is low, when storage is running low, and the like.

In a typical embodiment, the audio/video recording system 104 is a system for recording video and/or audio relating to an event. A typical audio/video recording system 104 includes a processor such as a CPU, memory, at least one recording device to capture audio and/or video, and at least one sensor. In a typical embodiment, the one or more sensors may include: siren status, light bar status, vehicle speed, auxiliary sensor status (e.g., removal of a weapon from a weapon rack), actuation of a manual record button, and the like. In a typical embodiment, the audio/video recording system 104 may use various criteria to determine when an event has begun or ended. For example, the criteria may include information from one or more sensors or analysis of a status message that was received from one of the mobile devices 102(1) and 102(2).

Once the audio/video recording system 104 has determined that an event has begun, an additional determination is made by the audio/video recording system 104 to decide whether or not to begin recording audio and/or video of the event. In a typical embodiment, the audio/video recording system 104 uses its logic tree to determine whether or not to record. For example, if the event is a traffic stop, the audio/video recording system 104 may use the light bar status as the criteria to recognize that the traffic stop has begun. The audio/video recording system 104 then determines if recording should begin. The determination of whether or not to record the event is based upon an analysis of the logic tree of the audio/video recording system 104. The logic tree may be configured as desired. Illustrative logic to begin a recording includes: start recording if storage is not full; start recording if camera is operational; and the like. If a recording is begun by the audio/video recording system 104, a determination to stop recording is similarly made by the audio/video recording system 104 by following its logic tree. Illustrative logic to stop a recording includes: stop recording if an officer manually indicates that the recording should be stopped; stop recording if camera is not operational; stop recording if storage is full; and the like.

In a typical embodiment, the audio/video recording system 104 sends out a status message in response to a change in the audio/video recording system 104's status/operating state. For example, a status message may be transmitted in response to a change in status of one or more of the sensors, a change of the audio/video recording system 104's recording status, and the like. In other embodiments, the audio/video recording system 104 may be configured to transmit status messages as desired.

In some embodiments, the audio/video recording system 104 is always recording (e.g., to a buffer in either volatile or non-volatile memory). In such an embodiment, the audio/video recording system 104 marks the beginning of an event with a start flag. An end of the event is marked with an end flag. By marking a recording with start and end flags, it is possible to identify and extract only the portion of the audio/video recording system 104's recorded video that relates to the event for uploading to the event library.

In various embodiments, the radios and radio modules described above may be any of various known types of wireless communication devices. For example, the radios and radio modules may use Wi-Fi, Bluetooth, cellular, satellite, and the like.

Figure 2A:
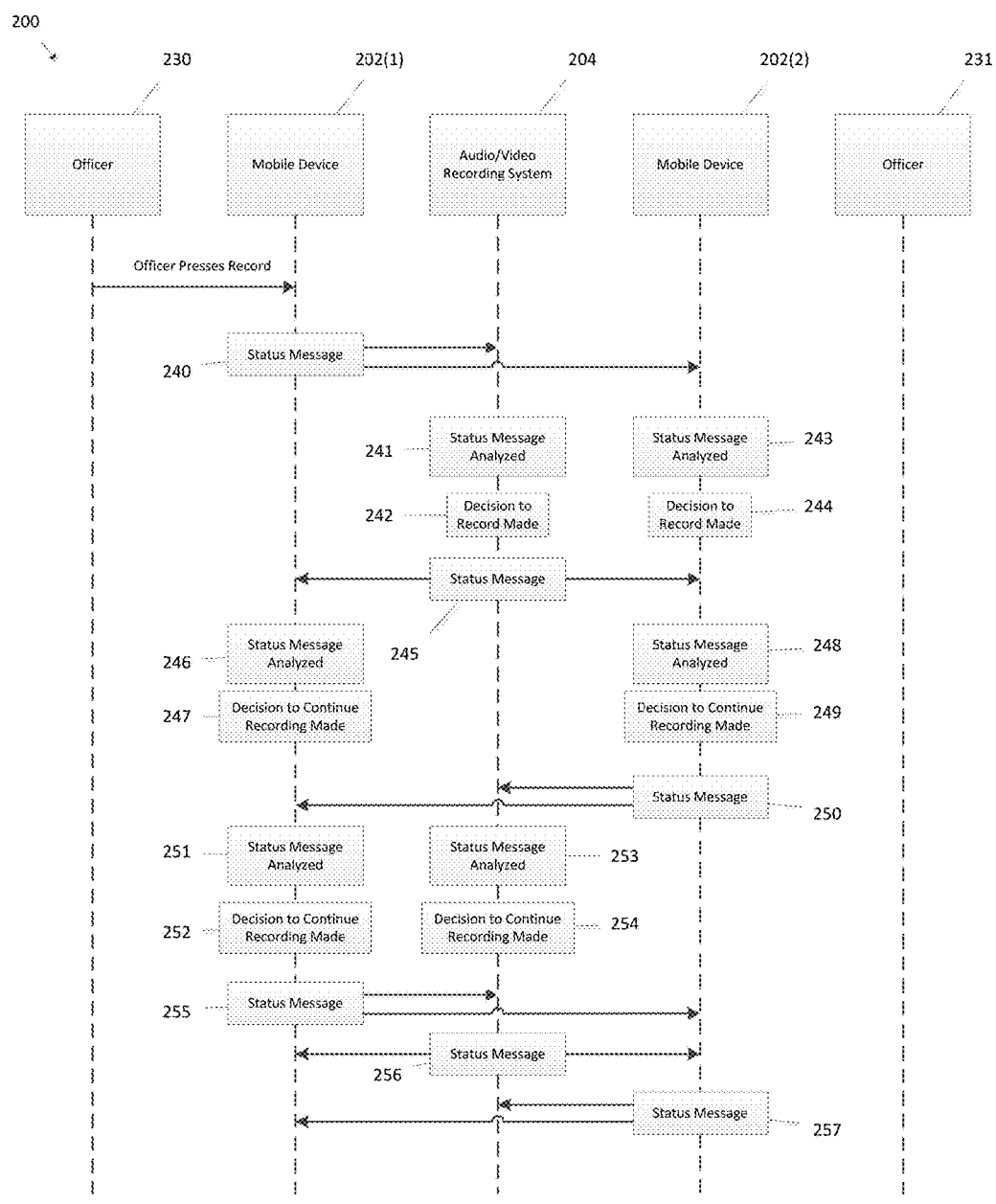
FIGS. 2A-B illustrate an example message flow between devices associated with a distributed multi-peer device-management system.
Figure 2B:
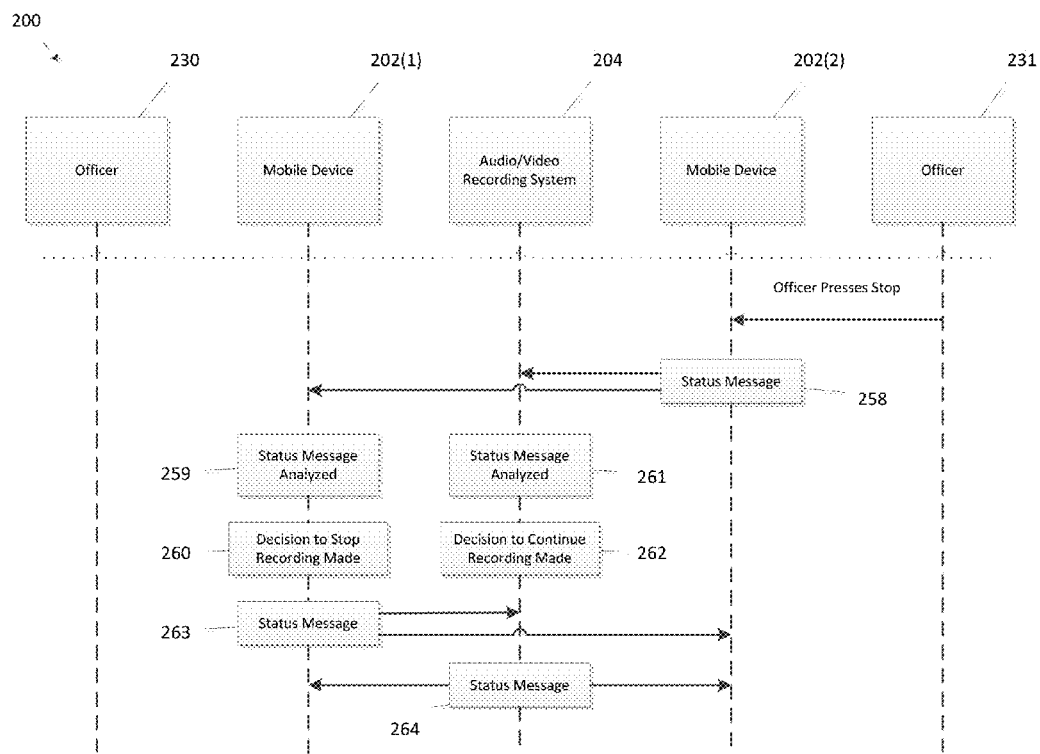

Referring now to FIGS. 2A and 2B, an illustrative message sequence of a distributed multi-peer device management system 200 is shown. FIG. 2B is a continuation of the illustrative message sequence that begins in FIG. 2A. The system 200 includes a mobile device 202(1), a mobile device 202(2), an audio/video recording system 204, an officer 230, and an officer 231. In the embodiment shown in FIGS. 2A and 2B, the system 200 does not include a mobile device base. It should be understood that the system 200 could be modified to include a mobile device base without departing from the principles of the invention.

The illustrative message sequence of FIGS. 2A and 2B shows a scenario where the mobile device 202(1) is the first device to record. The message sequence begins when the officer 230 presses a record button on the mobile device 202(1). The message sequence would be similar for other scenarios where the mobile device 202(1) was the first to record, such as, for example, if the mobile device 202(1) began recording in response to a decision based on its internal logic tree. When the record button of the mobile device 202(1) is pressed, a status message 240 is created by the mobile device 202(1). The status message 240 may include a variety of information regarding a status of the mobile device 202(1). For example, the status message 240 may include an identification of the message sender, recording status (e.g., "on" or "off," recording duration), a unique recording identifier, device location, battery level, memory availability, device status (e.g., operational, malfunctioning), LHF, time information (e.g., a timestamp, time information from GPS data), GPS location information, and the like.

After the status message 240 has been created by the mobile device 202(1), the status message 240 is transmitted by a radio module of the mobile device 202(1). The transmitted status message 240 is then available to be received by other devices associated with the system 200. For example, as shown in FIG. 2A, the transmitted status message 240 is received by the audio/video recording system 204 and the mobile device 202(2). In some embodiments, a device that receives a status message may send an acknowledgement to the device that sent the status message for each status message that is received (not shown).

Each device that receives the status message 240 analyzes the status message 240 to determine if, based on an internal logic tree of the receiving device, a change to its recording status should be made. For example, as shown in FIG. 2A, the audio/video recording system 204 analyzes the status message 240 at step 241 and decides to begin recording at step 242. Similarly, at step 243, the mobile device 202(2) analyzes the status message 240 and determines at step 244 that a recording should be started. In other scenarios, the audio/video recording system 204 and/or the mobile device 202(2) may decide not to record based on its logic tree. In some embodiments, in response to a decision to record, the mobile device 202(1) and/or the mobile device 202(2) can perform additional processing to determine whether local conditions thereon, such as insufficient memory or a low battery level, should at least temporarily override the recording decision. Examples of the additional processing will be described in greater detail with respect to FIG. 5.

In response to the decision by the audio/video recording system 204 to begin recording, a status message 245 is created by the audio/video recording system 204 and transmitted to the mobile device 202(1) and the mobile device 202(2) to inform the mobile device 202(1) and the mobile device 202(2) that the audio/video recording system 204 has begun recording. Similarly, the mobile device 202(2) creates and transmits a status message 250 to inform the audio/video recording system 204 and the mobile device 202(1) that the mobile device 202(2) has begun recording. In a typical embodiment, the status messages 245 and 250 are created and sent by the audio/video recording system 204 and the mobile device 202(2), respectively, substantially simultaneously.

At step 246, the mobile device 202(1) analyzes the status message 245 to determine, using its internal logic tree, whether a change to its recording status should be made. At step 247, the mobile device 202(1) decides to continue recording. Similarly, at step 248, the mobile device 202(2) analyzes the status message 245 to determine whether a change to its recording status should be made. At step 249, the mobile device 202(2) decides to continue recording. In other scenarios, the mobile device 202(1) and/or 202(2) may decide to stop recording based on its logic tree as that tree is expressed in software and/or configuration file settings. At step 251, the mobile device 202(1) analyzes the status message 250. At step 252, the mobile device 202(1) decides, using its internal logic tree, to continue recording. Similarly, at step 253, the audio/video recording system 204 analyzes the status message 250. At step 254, the audio/video recording system 204 decides to continue recording. In other scenarios, the mobile device 202(1) and/or the audio/video recording system 204 may decide to stop recording based on its logic tree.

In a typical embodiment, subsequent to steps 252 and 254, the mobile device 202(1), audio/video recording system 204, and the mobile device 202(2) create status messages 255, 256, 257, respectively. The status message 255 is transmitted to the audio/video recording system 204 and the mobile device 202(2). The status message 256 is transmitted to the mobile devices 202(1) and 202(2). The status message 257 is transmitted to the mobile device 202(1) and the audio/video recording system 204. The status messages 255, 256, and 257 are summary reports that provide up-to-date information regarding the status of the sender of the message. For example, the status message 255 provides the audio/video recording system 204 and the mobile device 202(2) with information regarding the current status of the mobile device 202(1) and also resends the status information regarding the audio video/recording system 204 and the mobile device 202(2) that was previously sent to the mobile device 202(1) by the audio video/recording system 204 and the mobile device 202(2), respectively. By resending the last reported status of the mobile device 202(2) and the audio/video recording system 204 to the mobile device 202(2) and the audio/video recording system 204, each of the mobile device 202(2) and the audio/video recording system 204 can independently confirm that the information is up-to-date and current. Such a confirmation is particularly useful when a device has gone out of range of the system 200 and then comes back into communication range with the system 200. When a device that has lost communication with the system 200 regains communication with the system 200, status messages, such as the status messages 255, 256, and 257, provide an up-to-date summary report of the status of the other devices in the system 200. Once the up-to-date information has been received by a device that has regained communication with the system 200, that device can reevaluate whether or not it should be recording. In some embodiments, when a new status message is received by a device, the device can compare its current status information to the status information contained in the status message. If the status information is incorrect, the device can send out an updated status message to correct the information. In this way, the system 200 uses status messages to "self-heal."

Continuing on to FIG. 2B, the officer 231 has pressed a button to stop the mobile device 202(2) from recording. Stopping the mobile device 202(2) from recording results in a change to the status of the mobile device 202(2), which further results in the mobile device 202(2) creating a status message 258 that is transmitted to the mobile device 202(1) and the audio/video recording system 204. At step 259, the mobile device 202(1) analyzes the status message 258. At step 260, the mobile device 202(1) decides, using its internal logic tree, to stop recording, which further results in the mobile device 202(1) creating a status message 263 that is transmitted to the mobile device 202(2) and the audio/video recording system 204. Similarly, at step 261, the audio/video recording system 204 analyzes the status message 258. At step 262, the audio/video recording system 204 decides to continue recording, which further results in the audio/video recording system 204 creating a status message 264 that is transmitted to the mobile device 202(1) and the mobile device 202(2). In other scenarios, the mobile device 202(1) may decide to continue recording and the audio/video recording system 204 may decide to stop recording.

In the embodiment of FIGS. 2A and 2B, the outcomes of the various analysis steps are dependent upon each device's particular configuration settings and operating status. It should be understood that the various decisions above by the mobile device 202(1), the mobile device 202(2), and the audio/video recording system 204 to begin recording, continue recording, or stop recording could have different outcomes based upon different configuration settings or operating status. For example, if in step 243 the mobile device 202(2) determines that its battery level is low, the mobile device 202(2) may instead decide not to record or to enter a holding state as described in greater detail with respect to FIG. 5.

Although not shown in FIGS. 2A and 2B, it should be understood that each time the mobile device 202(1), the mobile device 202(2), and the audio/video recording system 204 receive a status message, the mobile device 202(1), the mobile device 202(2), and the audio/video recording system 204 may make other determinations in addition to determining whether to make a change to its recording status. For example, in response to receiving a status message, one or more of the mobile device 202(1), the mobile device 202(2), and the audio/video recording system 204 may determine whether or not to send out an alert that an officer needs assistance or may share GPS location information. Various other determinations could be incorporated into a device's configuration file as desired.

Figure 3:
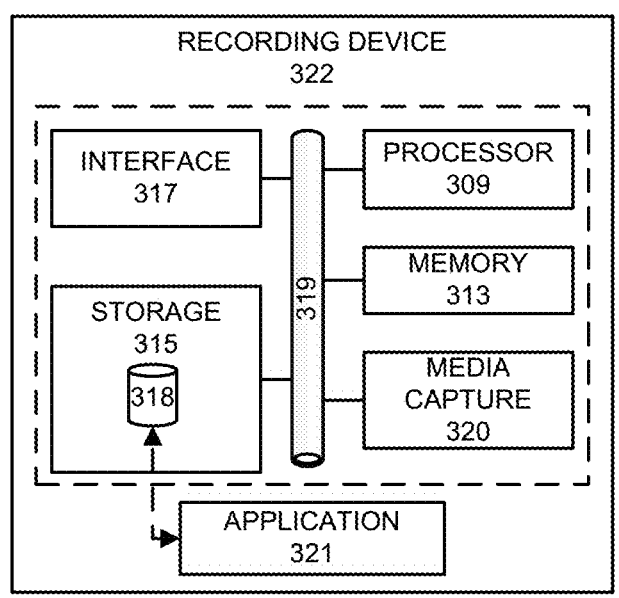
FIG. 3 illustrates an example of a recording device.

FIG. 3 illustrates an example of a recording device 322. The recording device 322 can be implemented, for example, as one of the mobile devices 102 and/or the audio/video recording system 104 of FIG. 1. The components of the recording device 322 may comprise any suitable physical form, configuration, number, type and/or layout. As an example, and not by way of limitation, the recording device 322 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a wearable or body-borne computer, a personal digital assistant (PDA), a server, or a combination of two or more of these. Where appropriate, the recording device 322 may include one or more computer systems; be unitary or distributed; span multiple locations; span multiple machines; or reside in a cloud, which may include one or more cloud components in one or more networks.

In the depicted embodiment, the recording device 322 includes a processor 309, memory 313, storage 315, interface 317, and bus 319. Although a system is depicted having a particular number of particular components in a particular arrangement, this disclosure contemplates any system having any suitable number of any suitable components in any suitable arrangement. Processor 309 may be a microprocessor, controller, or any other suitable computing device, resource, or combination of hardware, software and/or encoded logic operable to provide, either alone or in conjunction with other components, (e.g., memory 313) wireless networking functionality. Such functionality may include providing various features discussed herein. In particular embodiments, processor 309 may include hardware for executing instructions, such as those making up a computer program. As an example and not by way of limitation, to execute instructions, processor 309 may retrieve (or fetch) instructions from an internal register, an internal cache, memory 313, or storage 315; decode and execute them; and then write one or more results to an internal register, an internal cache, memory 313, or storage 315.

In particular embodiments, processor 309 may include one or more internal caches for data, instructions, or addresses. This disclosure contemplates processor 309 including any suitable number of any suitable internal caches, where appropriate. As an example and not by way of limitation, processor 309 may include one or more instruction caches, one or more data caches, and one or more translation lookaside buffers (TLBs). Instructions in the instruction caches may be copies of instructions in memory 313 or storage 315 and the instruction caches may speed up retrieval of those instructions by processor 309. Data in the data caches may be copies of data in memory 313 or storage 315 for instructions executing at processor 309 to operate on; the results of previous instructions executed at processor 309 for access by subsequent instructions executing at processor 309, or for writing to memory 313, or storage 315; or other suitable data. The data caches may speed up read or write operations by processor 309. The TLBs may speed up virtual-address translations for processor 309. In particular embodiments, processor 309 may include one or more internal registers for data, instructions, or addresses. Depending on the embodiment, processor 309 may include any suitable number of any suitable internal registers, where appropriate. Where appropriate, processor 309 may include one or more arithmetic logic units (ALUs); be a multi-core processor; or any other suitable processor.

Memory 313 may be any form of volatile or non-volatile memory including, without limitation, magnetic media, optical media, random access memory (RAM), read-only memory (ROM), flash memory, removable media, or any other suitable local or remote memory component or components. In particular embodiments, memory 313 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 313 may include one or more memories 313, where appropriate. Memory 313 may store any suitable data or information utilized by the recording device, including software embedded in a computer readable medium, and/or encoded logic incorporated in hardware or otherwise stored (e.g., firmware). In particular embodiments, memory 313 may include main memory for storing instructions for processor 309 to execute or data for processor 309 to operate on. In particular embodiments, one or more memory management units (MMUs) may reside between processor 309 and memory 313 and facilitate accesses to memory 313 requested by processor 309.

As an example and not by way of limitation, the recording device 322 may load instructions from storage 315 or another source (such as, for example, another computer system) to memory 313. Processor 309 may then load the instructions from memory 313 to an internal register or internal cache. To execute the instructions, processor 309 may retrieve the instructions from the internal register or internal cache and decode them. During or after execution of the instructions, processor 309 may write one or more results (which may be intermediate or final results) to the internal register or internal cache. Processor 309 may then write one or more of those results to memory 313. In particular embodiments, processor 309 may execute only instructions in one or more internal registers or internal caches or in memory 313 (as opposed to storage 315 or elsewhere) and may operate only on data in one or more internal registers or internal caches or in memory 313 (as opposed to storage 315 or elsewhere).

In particular embodiments, storage 315 may include mass storage for data or instructions. As an example and not by way of limitation, storage 315 may include a hard disk drive (HDD), a floppy disk drive, flash memory, an optical disc, a magneto-optical disc, magnetic tape, or a Universal Serial Bus (USB) drive or a combination of two or more of these. Storage 315 may include removable or non-removable (or fixed) media, where appropriate. Storage 315 may be internal or external to the recording device 322, where appropriate. In particular embodiments, storage 315 may be non-volatile, solid-state memory. In particular embodiments, storage 315 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 315 may take any suitable physical form and may comprise any suitable number or type of storage. Storage 315 may include one or more storage control units facilitating communication between processor 309 and storage 315, where appropriate.

In particular embodiments, interface 317 may include hardware, encoded software, or both providing one or more interfaces for communication (such as, for example, packet-based communication) among the recording device 322, other recording devices similar to the recording device 322, any networks, any network devices, and/or any other computer systems. As an example and not by way of limitation, interface 317 may include a network interface controller (NIC) or network adapter for communicating with an Ethernet or other wire-based network and/or a wireless NIC (WNIC) or wireless adapter for communicating with a wireless network.

In some embodiments, interface 317 comprises one or more radios coupled to one or more physical antenna ports. Depending on the embodiment, interface 317 may be any type of interface suitable for any type of network with which the recording device 322 is used. As an example and not by way of limitation, the recording device 322 can communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the recording device 322 can communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The recording device 322 may include any suitable interface 317 for any one or more of these networks, where appropriate.

In some embodiments, interface 317 may include one or more interfaces for one or more I/O devices. One or more of these I/O devices may enable communication between a person and the recording device 322. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 317 for them. Where appropriate, interface 317 may include one or more drivers enabling processor 309 to drive one or more of these I/O devices. Interface 317 may include one or more interfaces 317, where appropriate.

Bus 319 may include any combination of hardware, software embedded in a computer readable medium, and/or encoded logic incorporated in hardware or otherwise stored (e.g., firmware) to couple components of the recording device 322 to each other. As an example and not by way of limitation, bus 319 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 319 may include any number, type, and/or configuration of buses 319, where appropriate. In particular embodiments, one or more buses 319 (which may each include an address bus and a data bus) may couple processor 309 to memory 313. Bus 319 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 309 (such as, for example, one or more internal registers or caches), one or more portions of memory 313, one or more portions of storage 315, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Perl, Structured Query Language (SQL), or a suitable extension thereof. In particular embodiments, encoded software is expressed in a lower-level programming language, such as assembly language (or machine code). In particular embodiments, encoded software is expressed in scripting or command language that can be interpreted by a command-line interpreter (e.g., BASH in a UNIX environment). In particular embodiments, encoded software is expressed in JAVA. In particular embodiments, encoded software is expressed in Hyper Text Markup Language (HTML), Extensible Markup Language (XML), or other suitable markup language.

Additionally, the recording device 322 can include a media capture component 320. The media capture component 320 can include video-capture hardware and/or software (e.g., a camera), audio-capture hardware and/or software (e.g., a microphone), combinations of same, and/or the like. In a typical embodiment, the media capture component 320 enables the recording device 322 to capture audio and/or video for processing and storage.

Operation of the recording device 322 can be facilitated by an application 321. In certain embodiments, the application 321 can access data store 318 on storage 315. The data store 318 can include, for example, one or more databases, one or more flat files, and/or the like. In an example, the data store 318 can store configuration settings that govern when group event recording is to occur. For example, the configuration settings of the data store 318 can be expressed as parameters. Furthermore, the application 321 can operate to store audio and/or video captured, for example, using the media capture component 320, as individual recordings in the data store 318. In addition, or alternatively, in some embodiments, metadata related to each recording can be stored in the data store 318 in relation to the recording as a metadata record or file.

In certain embodiments, the application 321 and the configuration settings stored in the data store 318 can, in combination, serve as an internal logic tree of the recording device 322. For example, the application 321 can include conditions under which the recording device 322 should initiate recording, continue recording, and/or stop recording. In various embodiments, the application 321 can use the configuration settings stored in the data store 318 as inputs for evaluating those conditions and taking appropriate recording action based thereon. For example, the configuration settings stored in the data store 318 can include parameters such as, for example, the parameters listed in Table 1 below.

TABLE 1

| Example Parameter | Description of Example Parameter |
| --- | --- |
| Group_Member_Start | Boolean parameter that indicates whether the recording device will participate in group event recording. |
| Group_Member_Stop | Boolean parameter that indicates whether the recording device is allowed to stop recording an event based on decisions of other recording devices to stop recording. |
| Manual_Stop | Boolean parameter that indicates whether a user is allowed to manually stop a recording that is part of a group event recording. |

TABLE 1-continued

| Example Parameter | Description of Example Parameter |
| --- | --- |
| Delay_Group_Event_Recording | Integer parameter specifying a number of seconds to delay the start of a group event recording on the recording device. |

In an example, with reference to Table 1 above, if the application 321 determines that "Group_Member_Start" is set to "true," the application 321 can configurably decide to initiate a recording upon receipt of a status message indicating that another recording device in the same multi-peer recording-device management system has made a decision to initiate a recording. Similarly, if the application 321 determines that "Group_Member_Stop" is set to "true," the application 321 can configurably decide to stop such a recording upon receipt of a status message indicating that another recording device in the same multi-peer recording-device management system has made a decision to stop its recording. In certain embodiments, the application 321 can include logic that only initiates or stops recordings in the fashion described above for status messages received from specific devices, specific types of devices, or combinations of devices.

For example, the application 321 could include logic that only initiates or stops a recording when a non-mobile device, such as the audio/video recording system 104 of FIG. 1, sends a status message indicates a decision to start or stop recording. In another example, the application 321 could include logic that only stops a recording when a specific recording device, such as the recording device whose status message originally initiated a recording decision-making process, sends a status message indicating a decision to stop recording. In yet another example, if the recording device 322 is an audio/video recording system such as the audio/video recording system 104 of FIG. 1, the application 321 could include logic that only starts recordings for particular event types such as, for example, activation of vehicle emergency lights, activation of vehicle sirens, activation of a wireless microphone or auxiliary input, vehicle crash detection, vehicle speed in excess of a threshold, combinations of same and/or the like. In still another example, if the recording device is a mobile device similar to the mobile devices 102 of FIG. 1, the application 321 could include logic such that, if the mobile device goes out of range of the other recording devices while recording, stops recording and then later comes back in range of the other recording devices, the mobile device neither resumes recording nor starts a new recording, even if those other recording devices are still recording when the mobile device comes back in range.

In addition, or alternatively, in certain embodiments, the functionality described with respect to any of the foregoing examples can be turned on or off via corresponding parameters in the configuration settings. For example, configuration parameters can be established for specific event types such that recording should be initiated or not initiated based on whether the corresponding parameter is "true" or "false." Other examples of configurably initiating and stopping recordings will be apparent to one skilled in the art after reviewing the present disclosure.

It should be appreciated that various implementations of the recording device 322 can include other components not explicitly shown or described with respect to FIG. 3. For example, if the recording device 322 is a mobile device similar to the mobile devices 102 of FIG. 1, the recording device 322 can include a battery that provides a limited power source to the recording device 322. The recording device 322 can also include any of the components described above with respect to the audio/video recording system 104 and/or the mobile devices 102, such as a GPS module, an accelerometer, etc. Other examples of variations will be apparent to one skilled in the art after reviewing the present disclosure.

Figure 4:
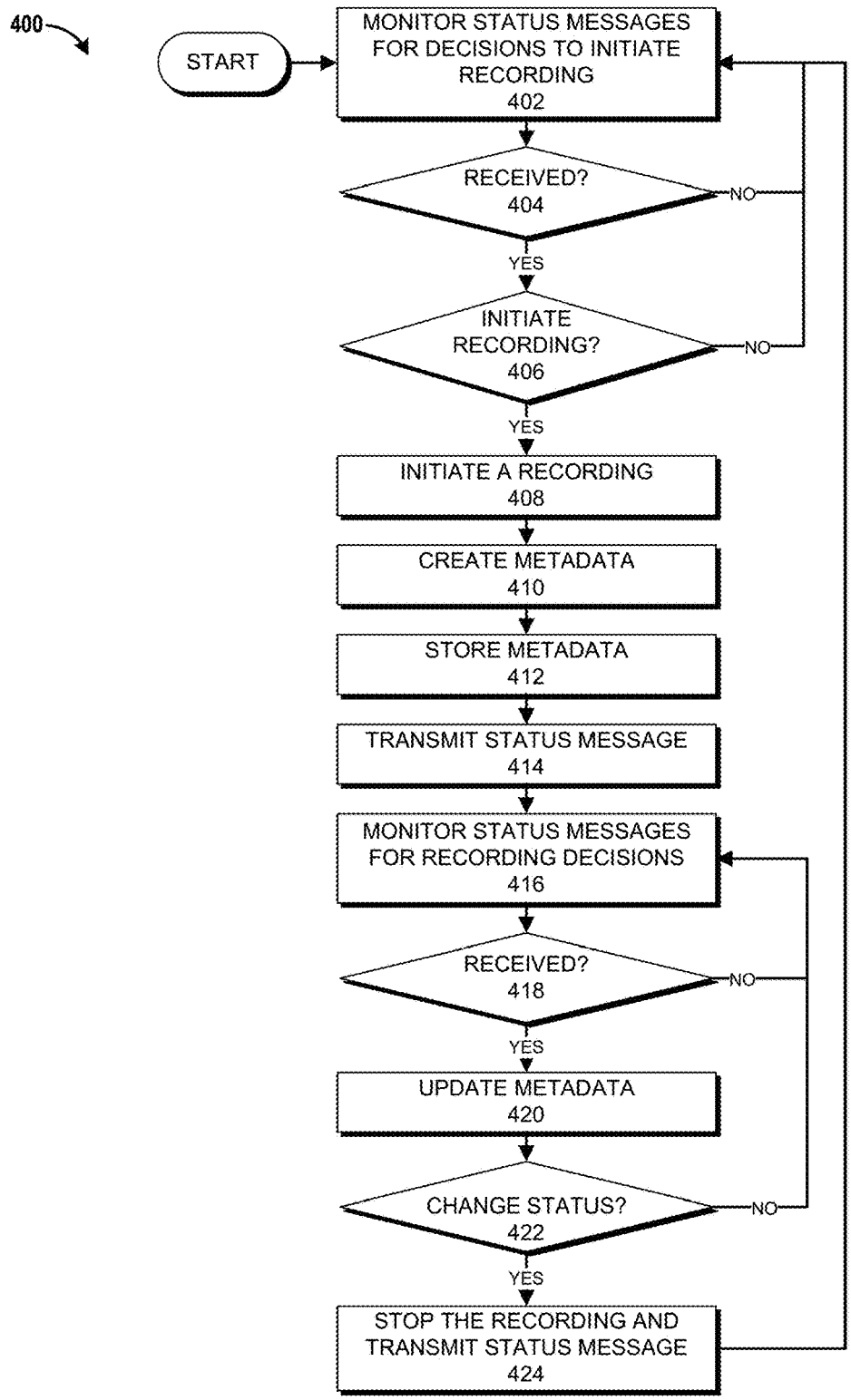
FIG. 4 illustrates an example of a process for implementing group event recording on a recording device.

FIG. 4 illustrates an example of a process 400 for implementing peer-to-peer group event recording on a recording device such as, for example, the recording device 322 of FIG. 3. In certain embodiments, a process similar to the process 400 can be initiated when the recording device is powered on or in response to another stimulus. In various embodiments, the process 400 can be executed, in whole or in part, by a computer system such as, for example, one or more of the mobile devices 102, the audio/video recording system 104, the mobile device 202(1), the mobile device 202(2), the audio/video recording system 204, the recording device 322, and/or a component of the foregoing. Although any number of computer systems can be involved in executing the process 400, for simplicity of description, the process 400 will be described with respect to the recording device 322 of FIG. 3. For purposes of illustration, the recording device 322 is assumed to begin the process 400 in an idle state such that, at the start of the process 400, the recording device 322 is not recording.

At block 402, the recording device 322 monitors status messages received from other recording devices of the same multi-peer recording-device management system for decisions by those recording devices to initiate a recording. For example, the multi-peer recording-device management system can be similar to the system 100 of FIG. 1. At decision block 404, the recording device 322 determines whether a new status message that indicates a decision to initiate recording has been received. If not, the process 400 returns to block 402 and continues to monitor status messages as described previously. Otherwise, if it is determined at decision block 404 that the recording device 322 has received a new status message that indicates a decision to initiate recording, the process 400 proceeds to decision block 406.

At decision block 406, the recording device 322 determines whether to initiate a recording on the recording device 322 based, at least in part, on the configuration settings and the new status message. The new status message can include, for example, an indicator of a decision by the sending recording device to initiate a recording on that device (e.g., an indicator of "on") and a unique recording identifier that is specific to the recording on the sending recording device. In addition, or alternatively, the new status message can include any of the other example data described above with respect to FIGS. 1, 2A-B, and 3 such as, for example, GPS location information, battery level, memory availability, device status (e.g., operational, malfunctioning), last-heard-from (LHF), combinations of same and/or the like. In general, the decision to initiate a recording can be based on any of the example conditions and criteria described above in relation to FIGS. 1, 2A-B, and 3.

If no determination to initiate a recording is made at decision block 406, the process 400 returns to block 402 and continues to monitor status messages as described previously. Otherwise, if it is determined at decision block 406 to initiate a recording on the recording device 322, the recording device 322 initiates a recording at block 408. The recording can be initiated, for example, by starting to record captured audio and/or video in the storage 315 of the recording device 322. Although not explicitly illustrated in FIG. 4, in some embodiments, in response to a decision to initiate recording, the recording device 322 can perform additional processing to determine whether local conditions thereon, such as insufficient memory or a low battery level, should at least temporarily override the recording decision. Examples of the additional processing will be described in greater detail with respect to FIG. 5.

At block 410, the recording device 322 creates metadata for the initiated recording. In general, the created metadata can include any of the example data described above that can be included in a status message as well as other data. For example, as part of the block 410, the recording device 322 can create a unique recording identifier that is specific to the recording initiated on the recording device 322. In a typical embodiment, each recording device that initiates a recording in the context of group event recording creates and maintains its own recording identifier that is distinct from the identifier of any other device participating in group event recording at a given time.

At block 412, the recording device 322 stores metadata for the recording in a metadata file for the recording. As described with respect to FIG. 3, the metadata file can reside, for example, in the data store 318 or in other memory. The stored metadata can include, for example, some or all of the data in the new status message that initiated the recording decision-making logic at decision block 406, some or all of the metadata created at block 410, and/or other data. By way of more specific example, the recording device 322 can store all known unique recording identifiers related to this particular instance of group event recording. In general, at the block 412, the recording device 322 may know of its own unique recording identifier (created at block 410) and of the unique recording identifier that was previously created by the recording device that sent the new status message (identified at decision block 404 as described above). Both unique recording identifiers can be stored in the metadata file and serve to identify the two recordings as related, although the two recordings are initiated on two different recording devices. As will be described in greater detail below, the recording device 322 can update the metadata file as it learns about additional recording devices that decide to record the event.

At block 414, the recording device 322 transmits a status message for receipt by other recording devices of the same multi-peer recording-device management system. The transmitted status message can include any of the example data described above with respect to other example status messages. For example, the transmitted status message can include an indicator of a decision by the recording device 322 to initiate the recording (e.g., an indicator of "on") and the unique recording identifier created, for example, as part of block 410. In certain embodiments, the other recording devices can process and react to the transmitted status message using, for example, a process similar to the process 400. Such a process can include creating and storing metadata as described above with respect to blocks 410-412 and updating metadata as will be described in greater detail below.

At block 416, the recording device 322 monitors status messages from other recording devices of the same multi-peer recording-device management system for recording decisions. The recording decisions can include, for example, other decisions to initiate recording, decisions to stop recording, and/or like decisions. At decision block 418, the recording device 322 determines whether a new status message that indicates a recording decision has been received. If not, the process 400 returns to block 416 and continues to monitor status messages from other recording devices as described previously. Otherwise, if it is determined at decision block 418 that a new status message that indicates a recording decision has been received, the process 400 proceeds to block 420.

At block 420, the recording device 322 updates the metadata file. For example, if the new status message identified at decision block 418 indicates a decision by a particular recording device to initiate or stop recording, the recording device 322 can extract, from the new status message, a unique recording identifier that was created by the particular recording device to identify its recording. The recording device 322 can store the extracted unique identifier in the metadata file as a known unique recording identifier related to this particular instance of group event recording. The block 420 can be omitted in cases where there is no metadata to update. For example, in some implementations, if the recording device 322 has previously seen another status message that contains the same unique recording identifier, the recording device 322 may not update the metadata file.

At decision block 422, the recording device 322 determines whether to change its recording status based, at least in part, on its configuration settings and the new status message identified at the decision block 418. If no determination to change the recording status is made at decision block 422, the process 400 returns to block 416, where the recording device 322 continues to record and continues to monitor status messages as described previously. In some embodiments, a status message indicating the decision to continue recording can be transmitted in connection with the return to block 416. Otherwise, if it is determined at decision block 422 to change the recording status of the recording device 322, the process 400 proceeds to block 424. At block 424, the recording device 322 stops the recording and transmits a status message to other recording devices of the same multi-peer recording-device management system. In general, the transmitted status message can be of a similar format to that described above with respect to block 414, except that the status message transmitted at block 424 typically includes an indicator of a decision by the recording device 322 to stop the recording (e.g., an indication of "off"). From block 424, the process 400 returns to block 402 and proceeds as described above.

In general, the process 400 can continue to execute iteratively until a suitable termination criterion is satisfied. Although not explicitly illustrated, various implementations can include exit conditions that cause or allow the process 400 to terminate at any point. For example, in some implementations, user input can be used to terminate the process 400 and/or stop recordings. Also, in some implementations, the process 400 and/or recordings can be stopped automatically after the expiration of a specified period of time. In addition, although the process 400 is described and illustrated as being executed in a particular sequence, the blocks of the process 400 need not be executed in that sequence. For example, although the creation of metadata at block 410 is illustrated as occurring subsequent to the recording being initiated, some or all of the metadata can also be created before or in parallel to initiating the recording. By way of further example, although status messages are illustrated as being transmitted after a recording is initiated or stopped, such status messages can also be sent before or in parallel to initiating or stopping the recording. Other rearrangements of the blocks of FIG. 4 will be apparent to one skilled in the art after reviewing the present disclosure.

Advantageously, in certain embodiments, execution of the process 400 can result in the metadata file of each initiated recording identifying a set of related recordings that occurred at a plurality of different recording devices of the same multi-peer recording-device management system. As described above, each recording of each recording device may later be transmitted to an event library. In certain embodiments, the identification of related recordings in the metadata file enables each specific recording to be coordinated/synchronized with other recordings as relating to the same group event recording. In these embodiments, the metadata file can advantageously enable subsequent synchronization and coordination of recordings without any need for a central event identifier across all recording devices of the multi-peer recording-device management system. Rather, in certain implementations, each recording device can generate its own unique recording identifier for each recording it initiates and maintain a metadata file for each recording that includes recording identifiers of related recordings initiated on other recording devices.

Figure 5:
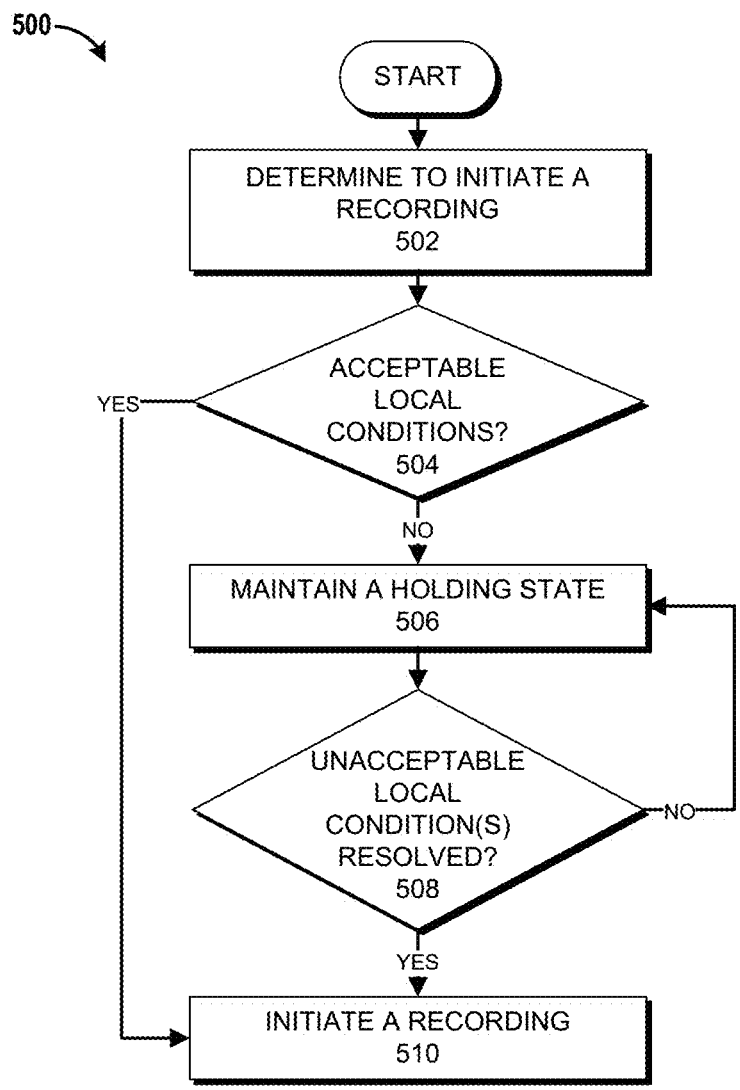
FIG. 5 illustrates an example of a process for initiating recording on a recording device.

FIG. 5 illustrates an example of a process 500 for initiating recording on a recording device such as, for example, the recording device 322 of FIG. 3. In certain embodiments, a process similar to the process 500 can be triggered whenever the recording device decides, based on its own internal logic tree, to initiate recording, for example, as a result of receiving a status message indicating that another recording device either is or soon will be recording. For example, in certain embodiments, the process 500 could replace, or be included as part of, steps 241-242 and 243-244 of FIG. 2A. By way of further example, the process 500 could replace, or be included as part of, blocks 406-408 of FIG. 4.

In various embodiments, the process 500 can be executed, in whole or in part, by a computer system such as, for example, one or more of the mobile devices 102, the audio/video recording system 104, the mobile device 202(1), the mobile device 202(2), the audio/video recording system 204, the recording device 322, and/or a component of the foregoing. Although any number of computer systems can be involved in executing the process 500, for simplicity of description, the process 500 will be described with respect to the recording device 322 of FIG. 3.

At block 502, the recording device 322 determines to initiate a recording as described, for example, with respect to steps 241-242 and 243-244 of FIG. 2A and with respect to decision block 406 of FIG. 4. At decision block 504, the recording device 322 determines whether local conditions are acceptable for initiating a recording. For example, in certain embodiments, the recording device 322 can look for fault conditions on the recording device 322 such as a battery level below a threshold (e.g., if the recording device 322 is a battery-powered device), available capacity in the storage 315 that is below a threshold, combinations of same and/or the like. In certain embodiments, the recording device 322 can treat fault conditions as unacceptable local conditions for recording.

If it is determined at decision block 504 that local conditions are acceptable for initiating recording, the process 500 proceeds to block 510 and a recording is initiated. Otherwise, if it is determined at decision block 504 that at least one local condition is not acceptable for initiating recording, the process 500 proceeds to block 506. At block 506, the recording device 322 maintains a holding state without initiating recording. While in the holding state, the recording device 322 can periodically check whether the unacceptable condition(s) identified at decision block 504 have been resolved so that recording can be initiated. In an example, if the storage 315 lacks sufficient capacity, sufficient capacity may later become available. In another example, if a battery level of the recording device 322 is below a threshold, the recording device 322 may later be provided an alternative or additional power source (e.g., another battery).

At decision block 508, the recording device 322 checks whether the unacceptable local condition(s) identified at decision block 504 have been resolved. If it is determined at decision block 508 that the unacceptable local condition(s) have been resolved, the process 500 proceeds to block 510 and a recording is initiated. Otherwise, if it is determined at decision block 508 that the unacceptable local condition(s) have not been resolved, the process 500 returns to block 506 and the recording device 322 remains in the holding state. In various embodiments, the process 500 can be terminated manually by a user or automatically, for example, upon the expiration of a period of time, in response to receiving a status message that all other recording devices in the system have stopped recording, or whenever other suitable stop criteria is satisfied.

In some embodiments, the process 500 can be modified such that there is no holding state when there is an unacceptable local condition on the recording device 322. In these embodiments, once an unacceptable local condition is determined to exist, the recording device 322 can elect not to participate in the group event recording. In these embodiments, the recording device 322 can omit the above-described periodic checking to determine whether unacceptable local condition(s) have been resolved.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The terms "a," "an" and other singular terms are intended to include the plural forms thereof unless specifically excluded.

What is claimed is:

1. A method comprising, by a particular recording device in a peer-to-peer recording system comprising a plurality of networked recording devices:
   receiving a first status message from a first recording device of the plurality of networked recording devices, wherein the first status message comprises:
      an indicator of a decision by the first recording device to initiate a first recording; and
      a first recording identifier that is specific to the first recording;
   determining to initiate a second recording on the particular recording device based, at least in part, on the first status message and configuration settings stored in memory on the particular recording device, wherein the configuration settings comprise a parameter related to whether the particular recording device will participate in group event recording;
   initiating a second recording on the particular recording device responsive to the determining;

creating a second recording identifier that is specific to the second recording;
storing information related to the first recording identifier and the second recording identifier in a metadata file for the second recording; and
transmitting a second status message for receipt by other recording devices of the plurality of networked recording devices, the second status message comprising:
an indicator of a decision by the particular recording device to initiate the second recording; and
the second recording identifier.

2. The method of claim 1, comprising:
receiving a third status message from a third recording device of the plurality of networked recording devices; wherein the third status message comprises:
an indicator of a decision by the third recording device to initiate a third recording; and
a third recording identifier that is specific to the third recording; and
storing information related to the third recording identifier in the metadata file for the second recording.

3. The method of claim 1, comprising:
receiving a stop-recording status message from the first recording device, the stop-recording status message comprising:
an indicator of a decision by the first recording device to stop the first recording; and
the first recording identifier;
determining to stop the second recording based, at least in part, on the stop-recording status message and the configuration settings; and
stopping the second recording.

4. The method of claim 3, comprising:
receiving a third status message from a third recording device of the plurality of networked recording devices; wherein the third status message comprises:
an indicator of a decision by the third recording device to initiate a third recording; and
a third recording identifier that is specific to the third recording;
determining to initiate a fourth recording on the particular recording device based, at least in part, on the third status message and the configuration settings;
determining that a local condition on the particular recording device is unacceptable for initiating recording;
maintaining a holding state during which the particular recording device periodically checks whether the unacceptable local condition has been resolved; and
responsive to a determination that the unacceptable local condition has been resolved, initiating the fourth recording on the particular recording device.

5. The method of claim 3, comprising:
receiving a third status message from a third recording device of the plurality of networked recording devices; wherein the third status message comprises:
an indicator of a decision by the third recording device to initiate a third recording; and
a third recording identifier that is specific to the third recording; and
determining not to initiate recording on the particular recording device based, at least in part, on the third status message and the configuration settings.

6. The method of claim 1, wherein the configuration settings comprise a parameter that indicates whether the particular recording device is allowed to stop recording based, at least in part, on decisions by other recording devices to stop recording.

7. The method of claim 1, wherein the configuration settings comprise a parameter that indicates whether a user is allowed to manually stop a recording that is triggered by group event recording.

8. The method of claim 1, wherein at least one of the first recording device and the particular recording device is a mobile device that communicates wirelessly.

9. The method of claim 1, wherein the second status message is transmitted before the second recording is initiated.

10. A network device comprising a processor and memory, wherein the processor and memory in combination are operable to implement a method comprising:
receiving a first status message from a first recording device of a plurality of networked recording devices, wherein the first status message comprises:
an indicator of a decision by the first recording device to initiate a first recording; and
a first recording identifier that is specific to the first recording;
determining to initiate a second recording on the network device based, at least in part, on the first status message and configuration settings stored in memory on the network device, wherein the configuration settings comprise a parameter related to whether the network device will participate in group event recording;
initiating a second recording on the network device responsive to the determining;
creating a second recording identifier that is specific to the second recording;
storing information related to the first recording identifier and the second recording identifier in a metadata file for the second recording; and
transmitting a second status message for receipt by other recording devices of the plurality of networked recording devices, the second status message comprising:
an indicator of a decision by the network device to initiate the second recording; and
the second recording identifier.

11. The network device of claim 10, the method comprising:
receiving a third status message from a third recording device of the plurality of networked recording devices; wherein the third status message comprises:
an indicator of a decision by the third recording device to initiate a third recording; and
a third recording identifier that is specific to the third recording; and
storing information related to the third recording identifier in the metadata file for the second recording.

12. The network device of claim 10, the method comprising:
receiving a stop-recording status message from the first recording device, the stop-recording status message comprising:
an indicator of a decision by the first recording device to stop the first recording; and
the first recording identifier;
determining to stop the second recording based, at least in part, on the stop-recording status message and the configuration settings; and
stopping the second recording.

13. The network device of claim 12, the method comprising:

receiving a third status message from a third recording device of the plurality of networked recording devices;
wherein the third status message comprises:
an indicator of a decision by the third recording device to initiate a third recording; and
a third recording identifier that is specific to the third recording;
determining to initiate a fourth recording on the network device based, at least in part, on the third status message and the configuration settings;
determining that a local condition on the network device is unacceptable for initiating recording;
maintaining a holding state during which the network device periodically checks whether the unacceptable local condition has been resolved; and
responsive to a determination that the unacceptable local condition has been resolved, initiating the fourth recording on the network device.

14. The network device of claim 12, the method comprising:
receiving a third status message from a third recording device of the plurality of networked recording devices;
wherein the third status message comprises:
an indicator of a decision by the third recording device to initiate a third recording; and
a third recording identifier that is specific to the third recording; and
determining not to initiate recording on the network device based, at least in part, on the third status message and the configuration settings.

15. The network device of claim 10, wherein the configuration settings comprise a parameter that indicates whether the network device is allowed to stop recording based, at least in part, on decisions by other recording devices to stop recording.

16. The network device of claim 10, wherein the configuration settings comprise a parameter that indicates whether a user is allowed to manually stop a recording that is triggered by group event recording.

17. The network device of claim 10, wherein at least one of the first recording device and the network device is a mobile device that communicates wirelessly.

18. The network device of claim 10, wherein the second status message is transmitted before the second recording is initiated.

19. A computer-program product comprising a non-transitory computer-usable medium having computer-readable program code embodied therein, the computer-readable program code adapted to be executed to implement a method on a particular recording device in a peer-to-peer recording system comprising a plurality of networked recording devices, the method comprising:
receiving a first status message from a first recording device of the plurality of networked recording devices, wherein the first status message comprises:
an indicator of a decision by the first recording device to initiate a first recording; and
a first recording identifier that is specific to the first recording;
determining to initiate a second recording on the particular recording device based, at least in part, on the first status message and configuration settings stored in memory on the particular recording device, wherein the configuration settings comprise a parameter related to whether the particular recording device will participate in group event recording;
initiating a second recording on the particular recording device responsive to the determining;
creating a second recording identifier that is specific to the second recording;
storing information related to the first recording identifier and the second recording identifier in a metadata file for the second recording; and
transmitting a second status message for receipt by other recording devices of the plurality of networked recording devices, the second status message comprising:
an indicator of a decision by the particular recording device to initiate the second recording; and
the second recording identifier.

20. The computer-program product of claim 19, the method comprising:
receiving a third status message from a third recording device of the plurality of networked recording devices;
wherein the third status message comprises:
an indicator of a decision by the third recording device to initiate a third recording; and
a third recording identifier that is specific to the third recording; and
storing information related to the third recording identifier in the metadata file for the second recording.

* * * * *